(12) United States Patent
Scheel

(10) Patent No.: US 7,337,716 B2
(45) Date of Patent: Mar. 4, 2008

(54) FRUIT PRESS

(75) Inventor: Ralf Scheel, Wuppertal (DE)

(73) Assignee: Gebr. Graef GmbH & Co., LG, Arnsburg (DE)

( * ) Notice: Subject to any disclaimer, the term of this patent is extended or adjusted under 35 U.S.C. 154(b) by 239 days.

(21) Appl. No.: 11/062,750

(22) Filed: Feb. 23, 2005

(65) Prior Publication Data

US 2005/0193903 A1     Sep. 8, 2005

(30) Foreign Application Priority Data

Feb. 24, 2004   (DE) .................. 10 2004 009 395
Jun. 9, 2004    (DE) .................. 10 2004 028 089

(51) Int. Cl.
*B30B 9/04*     (2006.01)
*A23N 1/00*     (2006.01)

(52) U.S. Cl. ............... 100/213; 100/48; 100/133; 100/135; 100/233; 99/506

(58) Field of Classification Search .......... 100/48, 100/131, 132, 133, 134, 135, 213, 233, 234; 99/506, 508

See application file for complete search history.

(56) References Cited

U.S. PATENT DOCUMENTS

| 468,341 | A | * | 2/1892 | Harris .................. 100/125 |
| 2,368,897 | A | * | 2/1945 | Strauss et al. ........... 74/16 |
| 2,470,708 | A | * | 5/1949 | Le Witt ................ 100/213 |
| 2,535,553 | A | * | 12/1950 | Stoner .................. 99/504 |
| 2,591,162 | A | * | 4/1952 | Kircher ................ 100/125 |
| 3,275,051 | A | * | 9/1966 | Jepson et al. ........... 99/502 |
| 4,706,559 | A | * | 11/1987 | De Zarate .............. 99/504 |

FOREIGN PATENT DOCUMENTS

| DE | 29806304 U1 | 4/1998 |
| DE | 10142506    | 3/2003 |
| EP | 0226691     | 7/1987 |

* cited by examiner

*Primary Examiner*—Jimmy T. Nguyen
(74) *Attorney, Agent, or Firm*—Hoffman, Wasson & Gitler

(57) ABSTRACT

A fruit press, in particular a citrus fruit press, having the following features: the fruit press has a mounting stand and a driving and pressing unit; the driving and pressing unit is mounted pivotably on the mounting means.

16 Claims, 4 Drawing Sheets

FRUIT PRESS

BACKGROUND OF THE INVENTION

The invention relates to a fruit press, in particular a fruit press for juicing citrus fruit.

The document bearing the publication number DE 101 42 506 A1 has disclosed a fruit press which has an electric motor that drives a spindle onto which a pressing cone can be fitted. The spindle passes through a recess in a collection vessel. The collection vessel has a spout which is provided above the base in a side wall of the collection vessel. The collection vessel can be pivoted about a horizontal axis between two limit positions. In one limit position, the spout is above the base of the collection vessel. In a second limit position, the collection vessel has been pivoted in such a way that the spout is below the base, so that a liquid which has collected in the collection vessel can flow out of the collection vessel via the spout. The latching means enable the collection vessel to be fixed in the limit positions.

The pivotability of the collection vessel with respect to the spindle and the pressing cone gives rise to a number of problems. For example, to ensure the pivotability of the collection vessel with respect to the pressing cone, the distance between the base of the collection vessel and the pressing cone must be greater than is usually the case in the known fruit presses. This makes it easier for liquid to splash into the region beneath the pressing cone. However, this is the region in which the spindle is guided through the base of the collection vessel, and the spindle has to be sealed with respect to the edge of the recess in the base of the collection vessel. On account of the fact that the collection vessel can pivot with respect to the spindle, to allow this pivotability the recess has to be relatively large. This leads to increased sealing costs. An additional difficulty is that the liquid, as has already been explained, can more easily splash into the region below the pressing cone, i.e. into the region in which the spindle is guided through the base of the collection vessel. A further drawback of the known fruit presses is that the design of the fruit presses which have been disclosed hitherto often looks old-fashioned for technical reasons.

A further problem of the apparatus which is known from document DE 101 42 506 is that operation of the fruit press described in the document is complicated. Specifically, the fruit press is configured in such a way that the operator first of all juices the fruit and then pours the fruit juice into a glass or similar receptacle by pivoting the collection vessel in which the fruit juice has collected. The operator has to wait during the pouring operation until the receptacle holding the fruit juice is available for consumption. Alternatively, the operator could move the collection vessel into its pouring position before the pressing operation starts and then initiate the juicing operation. In this case, the fruit juice would be discharged into the receptacle via the collection vessel at the same time as it is being juiced. Although this would eliminate the waiting time, there is no guarantee that the user will remember to previously place the vessel in the inclined position every time. Moreover, it is not ensured that the user will remember to return the collection vessel into its horizontal position after it has been emptied, in order to prevent residues from dripping.

This is where the present invention comes in.

Therefore, the invention is based on the object of proposing a fruit press in which the fruit juice is passed out of the collection vessel into a receptacle at the same time as it is being pressed.

Furthermore, the invention is based on the object of proposing a fruit press having a pivotable collection vessel in which the problems of sealing spindle and collection vessel are solved or can be solved in a technically elegant way with an attractive design of the fruit press.

SUMMARY OF THE INVENTION

A fruit press according to the invention has a mounting means and a driving and pressing unit. The driving and pressing unit is mounted on the mounting means such that it can be pivoted in its entirety. The collection vessel and the drive are provided in the driving and pressing unit, so that the two components can be pivoted together.

A fruit press according to the invention has a first switch and if appropriate a second switch, by means of which a drive of the driving and pressing unit can be switched on. The first and/or second switch may be fitted on the mounting means. It is also possible for the first switch to be part of the pressing unit.

The driving and pressing unit can be pivoted out of a first position into a second position in order to switch on the drive. The second switch of a fruit press according to the invention may be connected or arranged electrically in series with the first switch.

According to the invention, the fruit press may include a restoring means, by means of which the driving and pressing unit is automatically pivoted back out of the second position into the first position. The restoring means may be a spring, in particular a leg spring. Alternatively, in a fruit press according to the invention, the center of gravity of the driving and pressing unit may be arranged in such a way with respect to the pivot axis of the driving and pressing unit that the driving and pressing unit automatically pivots back out of the second position into the first position.

The drive of the fruit press is preferably an electric motor.

The collection vessel of a fruit press according to the invention may have a recess through which a spindle passes. The spindle in turn can be driven by the drive of the driving and pressing unit.

The driving and pressing unit of a fruit press according to the invention may comprise a pressing cone. The pressing cone is preferably releasably connected to the spindle. The second switch of a driving and pressing unit according to the invention may be actuable by an axial pressure on the spindle.

The driving and pressing unit has a pressure-exerting means for pressing a fruit onto the pressing cone. This allows a greater force to be exerted on the fruit and can thereby increase the yield of a pressing operation.

A driving and pressing unit according to the invention includes a housing part in which, for example, the drive is housed. The collection vessel may also be arranged in the housing part, in which case the collection vessel can preferably be removed from the housing part for cleaning purposes. The pressure-exerting means is advantageously fitted at least pivotably to the housing part.

The collection vessel of the driving and pressing unit of a fruit press according to the invention may have a base and a spout, with the spout being located above the base in the first position and below the base in the second position of the driving and pressing unit.

Furthermore, a fruit press according to the invention may comprise a cutting board, a serving board, a shallow dish or the like, which can preferably be mounted on the mounting means such that it can be retracted into the latter.

According to the invention, the mounting means may be formed by a stand or may include a stand.

In a fruit press, in particular in a fruit press according to the invention, the cutting board may be fitted releasably to a means for mounting the fruit press. A releasable arrangement of the cutting board of this nature makes it possible to clean the cutting board independently of the mounting means and the driving and pressing unit. The cutting board may in particular be placed in a dishwasher.

BRIEF DESCRIPTION OF THE DRAWINGS

An exemplary embodiment of a fruit press according to the invention is described in more detail with reference to the drawing, in which.

DETAILED DESCRIPTION OF THE INVENTION

Figure 1:
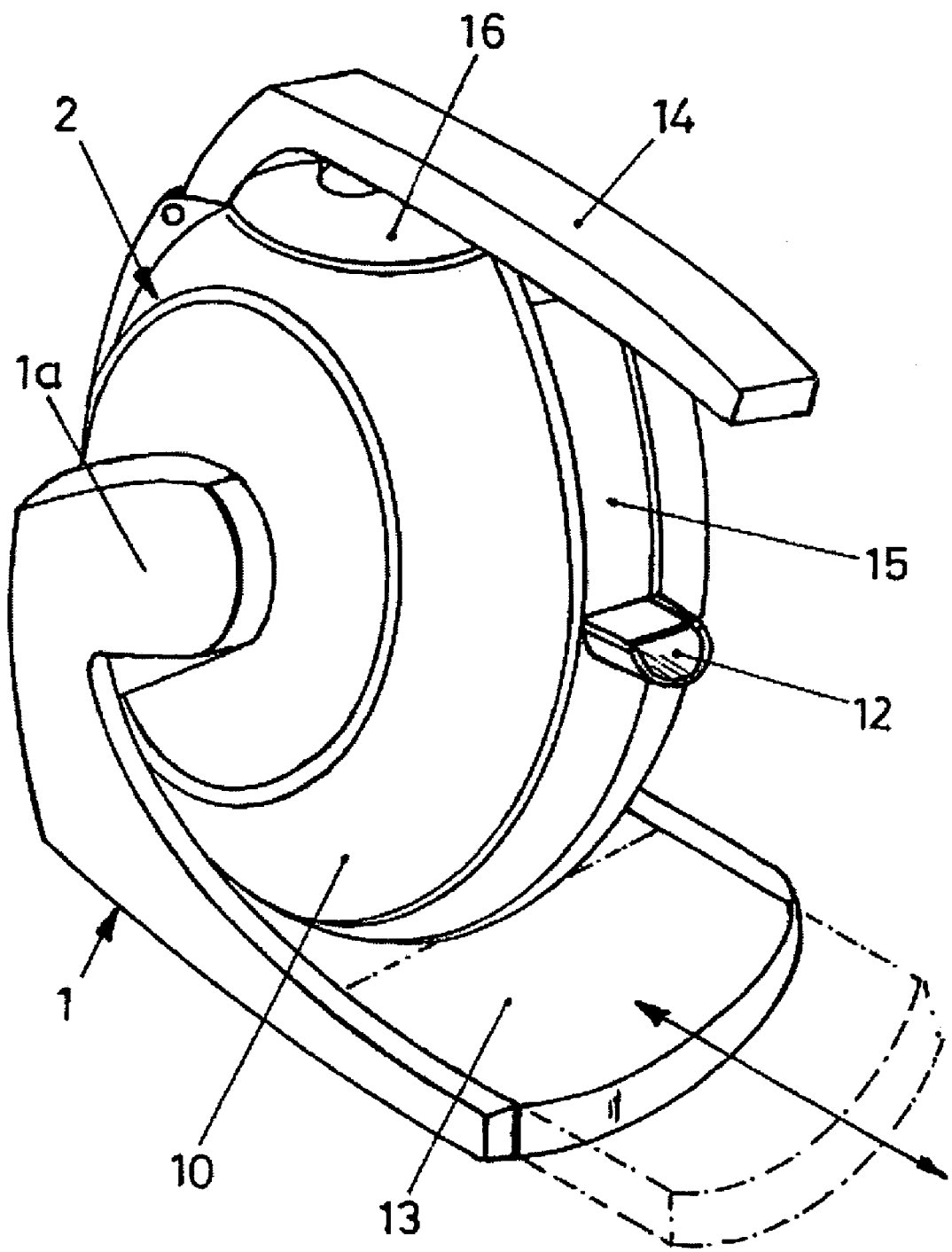
FIG. 1 shows a perspective view of the fruit press according to the invention.

The fruit press according to the invention is substantially formed by a stand 1 as a mounting means and a driving and pressing unit 2 mounted pivotably in the stand. The driving and pressing unit 2 is approximately in the form of an ellipsoid of revolution with flattened sides, with bearings for connection to the stand 1 being provided at the locations on the flattened sides. The stand 1 engages on the locations on the flattened sides of the driving and pressing unit 2 on both sides.

An intermediate space, into which a cutting board 13 is introduced, is provided beneath the driving and pressing unit 2 between a right-hand stand part 1a and a left-hand stand part 1b. For this purpose the cutting board 13 engages in grooves in the stand parts 1a, 1b, with the result that the cutting board 13 is securely held in the stand 1. The cutting board 13 can be used, for example, to halve the fruit which is to be pressed before it is pressed by means of the fruit press.

Figure 2:
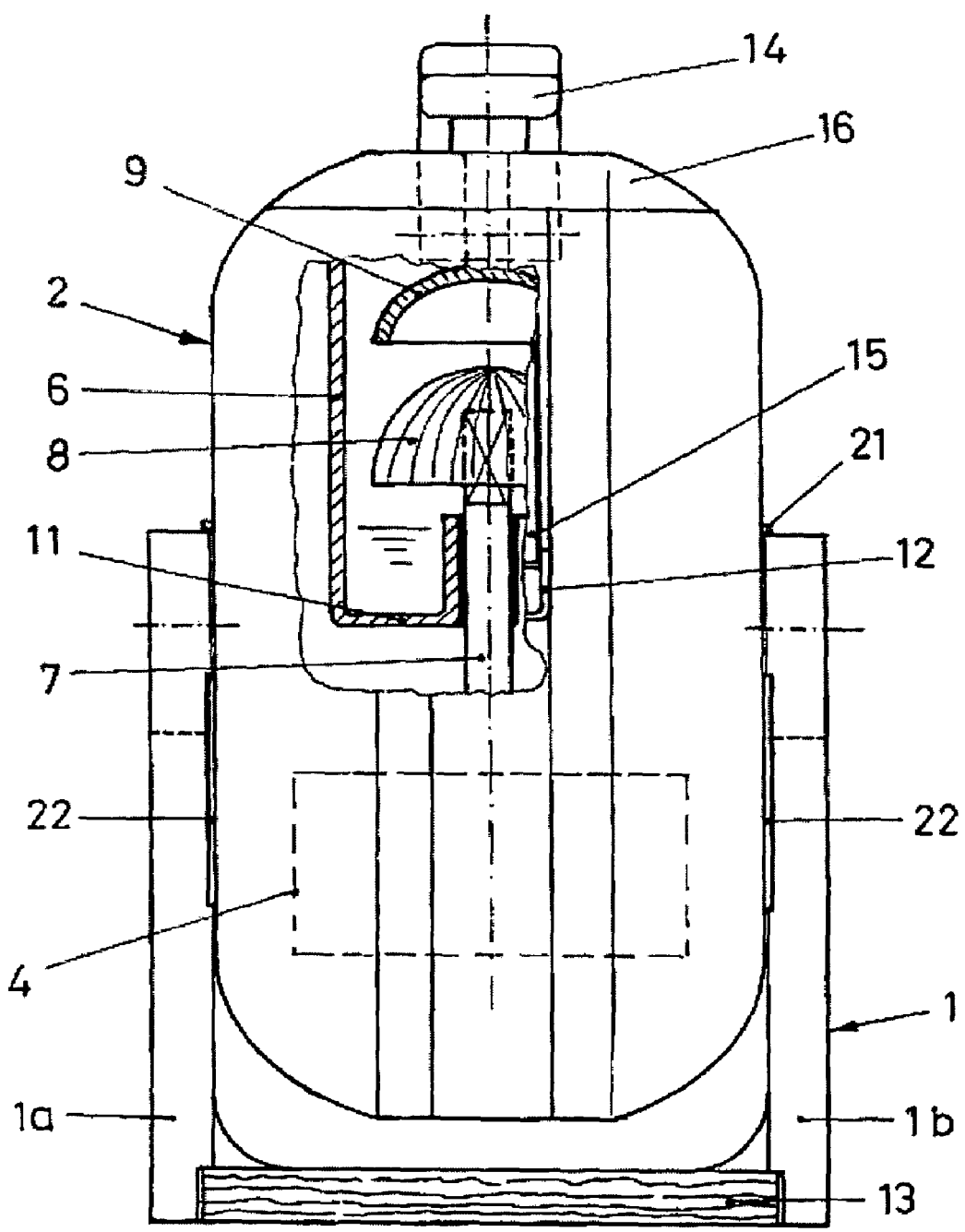
FIG. 2 shows a view of the front side of the fruit press, partially cut away or in section.
Figure 3:
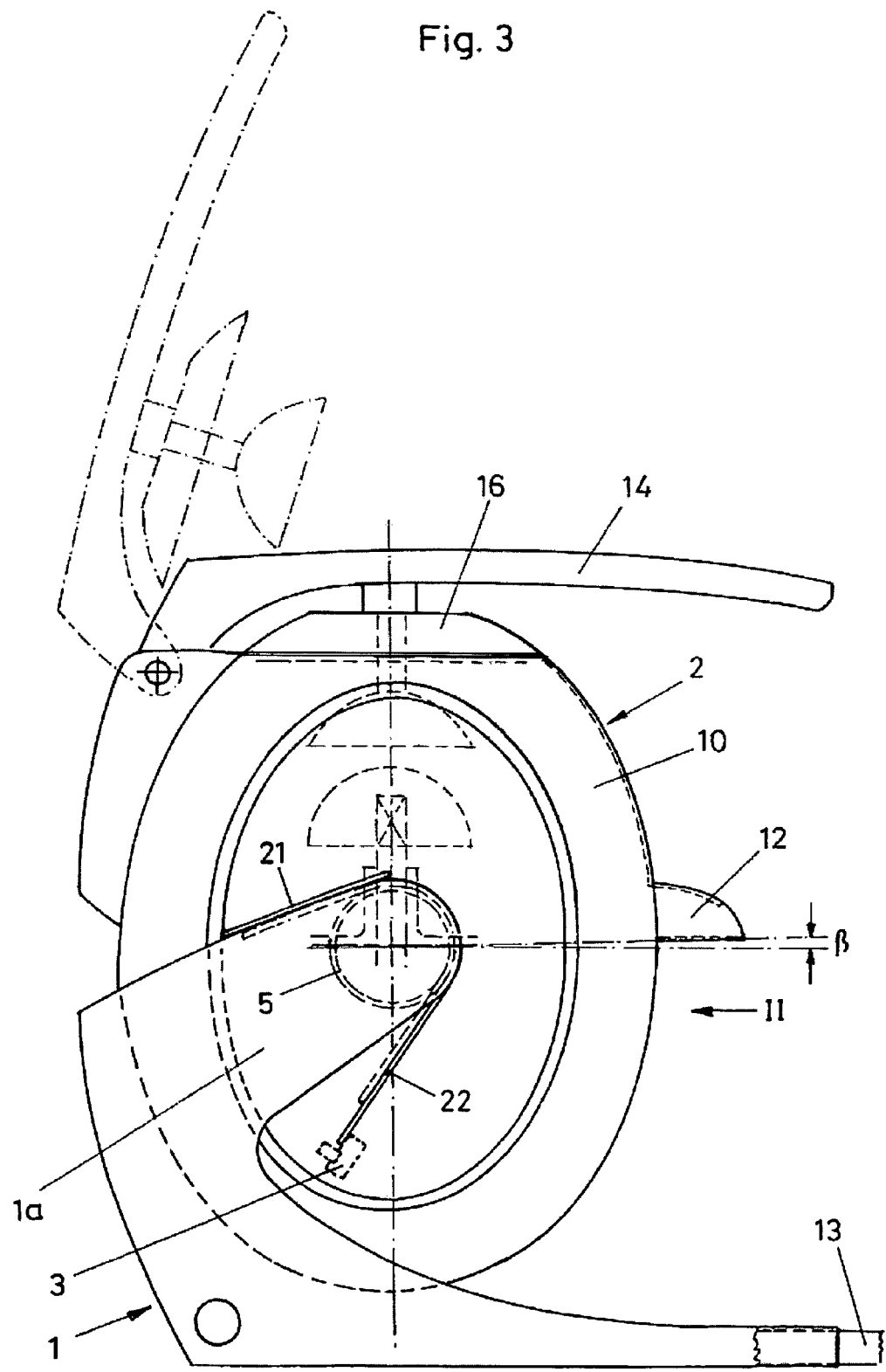
FIG. 3 shows a side view of the fruit press with the driving and pressing unit in a first position.
Figure 4:
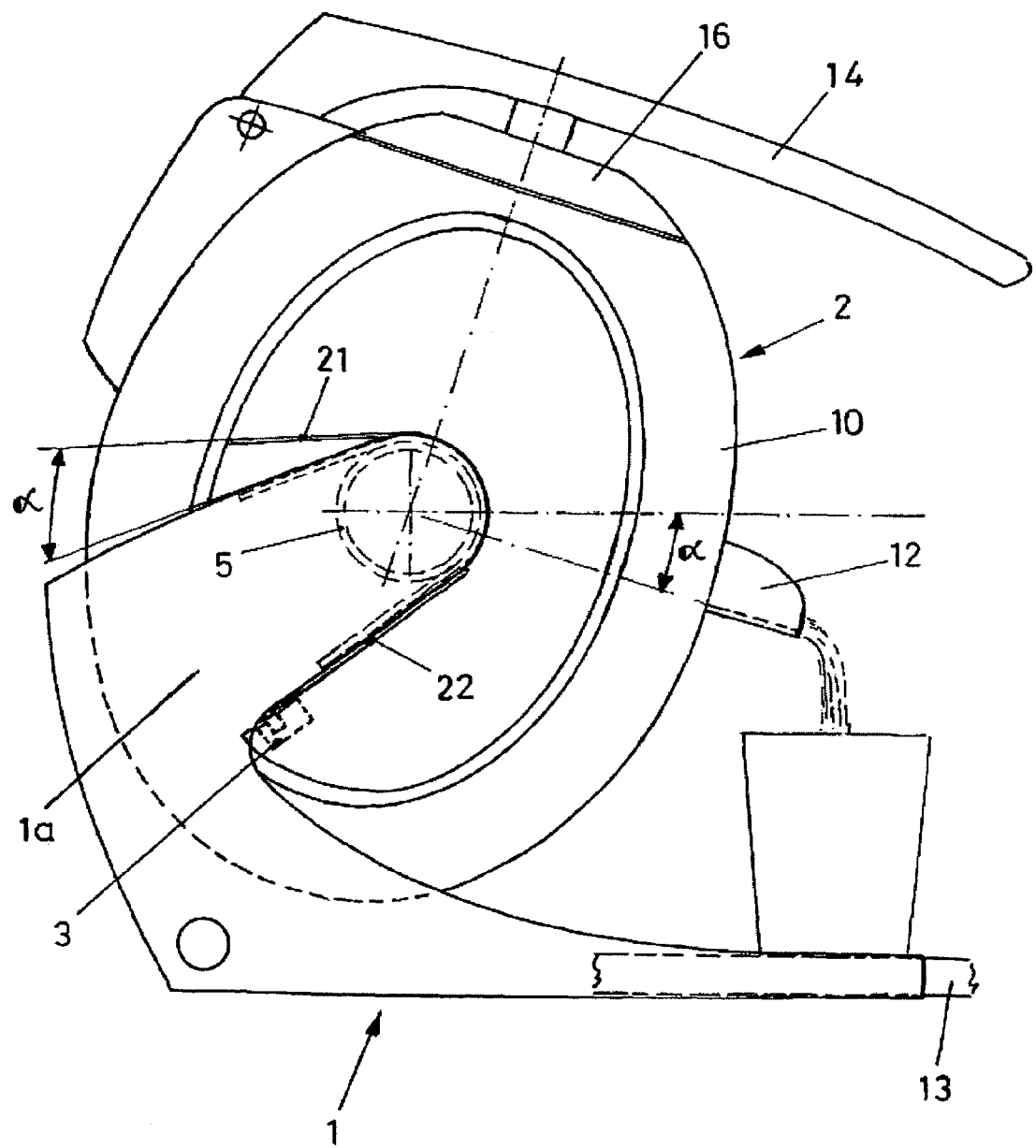
FIG. 4 shows a side view of the fruit press with the driving and pressing unit in a second position.

A housing part 10, an outlet 12, a pressure-exerting means 9 with a lever 14, and a first stop 21 and a second stop 22 are the main parts of the driving and pressing unit 2 illustrated in FIG. 1 and FIGS. 3 and 4. Furthermore, FIG. 2 also reveals parts of the driving and pressing unit 2 arranged in the interior of the housing part 10. These parts include the lower end of the pressure-exerting means 9, the collection vessel 6, a spindle 7 and a pressing cone 8. Furthermore, dashed lines in FIG. 2 illustrate a drive 4 of the driving and pressing unit 2.

The drive 4 is arranged in a lower region of the housing part 10 of the driving and pressing unit 2. The drive 4 is an electric motor. The mechanical power made available by the electric motor can be tapped off by means of the spindle 7. The upper end of the spindle is provided with a hexagonal outer contour and engages in an internal hexagonal contour of the pressing cone 8 of the driving and pressing unit 2. The pressing cone 8 can be detached from the spindle, for example in order to be cleaned.

The collection vessel 6 is arranged above the drive 4 in the housing part 10. The collection vessel 6 has a central recess through which the spindle 7 passes. Therefore, the pressing cone 8 which has been placed onto the end of the spindle 7 is arranged inside the collection vessel 6. The edges of the central recess in the base 11 of the collection vessel 6 are drawn upward in the direction of pressing cone 8, so that a liquid which is collected in the collection vessel 6 does not trickle down through the central recess. The collection vessel 6 has a spout 12. The spout 12 is formed by an aperture in the side wall of the collection vessel 6 just above the base 11 of the collection vessel 6 and by a channel-like attachment on the outer wall of the collection vessel 6. This channel-like attachment of the outlet 12 engages through a slot in the housing part 10 and opens out outside the housing part 10 of the driving and pressing unit 2. To enable the vessel 6 to be removed from the housing part 10, for example in order to be cleaned, the slot in the housing part 10 continues all the way to its upper edge. When the fruit press is in use, this slot is covered by a cover 15.

The pressure-exerting means 9 projects into the collection vessel 6 from above. The pressure-exerting means 9 is used to press the fruit that is to be pressed onto the pressing cone 8. On its side facing the pressing cone 8, therefore, the pressure-exerting means 9 has an outer surface which is matched to the top side of the pressing cone. The upper end of the pressure-exerting means is secured to a lid 16 which is fitted pivotably to the housing part 10 and in the closed position closes off the housing part 10 at the top. On the lid 16 there is a lever 14, by means of which the lid 16 can easily be opened and closed and by means of which, at the same time, a force for pivoting the driving and pressing unit 2 can also be applied to the driving and pressing unit 2, with the pressure-exerting means 9 simultaneously being pressed toward the pressing cone 8.

The fruit press according to the invention has at least one switch 3 which is secured to the driving and pressing unit 2 in such a way that when the driving and pressing unit 2 is pivoted the switch 3 is actuated. Furthermore, the fruit press has a restoring means 5 which is formed by a leg spring acting between the stand 1 and the driving and pressing unit 2. The driving and pressing unit can be pivoted between two stops through an angle α. A first stop 21 defines a first position of the driving and pressing unit 2, while a second stop 22 defines a second position of the driving and pressing unit.

The restoring means 5 is fitted in such a way between the driving and pressing unit and the stand 1 that the driving and pressing unit 2 is in the first position in the absence of the action of any external force and the driving and pressing unit is thereby in contact with the stand 1 by way of the first stop 21. To pivot the driving and pressing unit 2 into the second position, in which the driving and pressing unit 2 bears against the stand 1 by way of the second stop 22, a force is exerted on the lever 14. The lever 14 is pressed downward, with the result that the driving and pressing unit 2 is pivoted into the second position. The pivoting of the driving and pressing unit 2 into the second position actuates the switch 3, with the result that the drive 4 of the driving and pressing unit 2 is started up. The drive 4 drives the spindle 7, with the result that the pressing cone is set in rotation. One half of a fruit which has been placed into the fruit press, i.e. between the pressing cone 8 and the pressure-exerting means 9, is thereby juiced. The juicing is effected on the one hand by the rotation of the pressing cone 8 and on the other hand by the pressure on the lever 14, which is transmitted to the pressure-exerting means 9.

The pivoting of the driving and pressing unit 2 into the second position causes the spout 12 of the collection vessel 6 to adopt a position below the base 11 of the collection vessel 6. A liquid which is collecting on the base of the collection vessel can thereby flow out of the collection vessel 6 via the spout 12 and flow into a prepared receptacle, for example a glass. The application of a force to the lever 14 therefore has three effects. Firstly, the fruit is pressed onto the pressing cone 8 by way of the pressure-exerting means 9. Secondly, the pivoting into the second position causes the drive 4 to be switched on by means of the switch 3 and also causes the spout 12 to be pivoted downward, so that a liquid which is collecting in the collection vessel 6 can flow out of the collection vessel 6 via the spout 12.

What is claimed is:

1. A fruit press comprising a mounting means and a driving and pressing unit, the driving and pressing unit is mounted pivotably on the mounting means;
    the driving and pressing unit comprises a drive motor a first switch, by means of which the drive motor of the driving and pressing unit can be switched on;
    the driving and pressing unit comprises a juice collection vessel;
    the juice collection vessel has a recess through which a spindle passes;
    the spindle can be driven by the drive;
    the driving and pressing unit further comprises a pressing cone and a pressure exerting means for pressing a fruit onto the pressing cone; and
    the pressing cone is releasably connected to the spindle.

2. The fruit press as claimed in claim 1, wherein the driving and pressing unit can be pivoted out of a first position into a second position in order to close the first switch.

3. The fruit press as claimed in claim 1, further comprising a restoring means, wherein the driving and pressing unit is automatically pivoted back out of a second position into a first position.

4. The fruit press as claimed in claim 3, wherein the restoring means is a spring, or a leg spring.

5. The fruit press as claimed in claim 2, wherein a center of gravity of the driving and pressing unit is arranged in such a way with respect to a pivot axis that the driving and pressing unit automatically pivots back out of the second position into the first position.

6. The fruit press as claimed in claim 1, wherein the driving and pressing unit has a housing part.

7. The fruit press as claimed in claim 6, wherein the drive motor of the driving and pressing unit is housed in the housing part.

8. The fruit press as claimed in claim 6, wherein collection vessel is fitted in the housing part.

9. The fruit press as claimed in claim 6, wherein the pressure-exerting means is fitted pivotably to the housing part.

10. The fruit press as claimed in claim 1, wherein the collection vessel has a base and a spout which is above the base in a first position and the spout is below the base in a second position.

11. The fruit press as claimed in claim 1, further comprising a cutting board which is fitted releasably to said mounting means.

12. A fruit press, in particular a citrus fruit press, comprising:
    a mounting means and a driving and pressing unit;
    the driving and pressing unit is mounted pivotably on the mounting means;
    the driving and pressing unit comprises drive motor a first switch, by means of which the drive motor of the driving and pressing unit can be switched on;
    the driving and pressing unit is pivoted out of a first position into a second position in order to close the first switch;
    the driving and pressing unit comprises a juice collection vessel;
    the juice collection vessel has a recess through which a spindle passes;
    the spindle can be driven by the drive;
    the driving and pressing unit further comprises a pressing cone and a pressure exerting means for pressing a fruit onto the pressing cone;
    the pressing cone is releasably connected to the spindle; and
    the collection vessel has a base and a spout which is above the base in the first position and the spout is below the base in the second position.

13. The fruit press as claimed in claim 12, wherein the driving and pressing unit has a housing part.

14. The fruit press as claimed in claim 13, wherein the drive motor is housed in the housing part.

15. The fruit press as claimed in claim 13, wherein the collection vessel is fitted in the housing part.

16. The fruit press as claimed in claim 14, wherein the collection vessel is fitted in the housing part.

* * * * *

UNITED STATES PATENT AND TRADEMARK OFFICE
CERTIFICATE OF CORRECTION

PATENT NO. : 7,337,716 B2
APPLICATION NO. : 11/062750
DATED : March 4, 2008
INVENTOR(S) : Ralf Scheel It is certified that error appears in the above-identified patent and that said Letters Patent is hereby corrected as shown below:

Title Pg, Item (73) Assignee should read as follows:
(73) Assignee: Gebr, Graef GmbH & Co., KG
              Arnsberg (DE)

Signed and Sealed this

Twenty-ninth Day of December, 2009

David J. Kappos
*Director of the United States Patent and Trademark Office*